United States Patent [19]

Kay

[11] 4,188,409
[45] Feb. 12, 1980

[54] BEVERAGE PRODUCT AND PROCESS

[76] Inventor: Charles Kay, 9390 Whitneyville Ave., Alto, Mich. 49302

[21] Appl. No.: 948,166

[22] Filed: Oct. 3, 1978

Related U.S. Application Data

[63] Continuation-in-part of Ser. No. 803,147, Jun. 3, 1977, abandoned.

[51] Int. Cl.$^2$ ............................................. A23F 1/14
[52] U.S. Cl. ................................... 426/78; 426/96; 426/289; 426/308; 426/595; 426/596; 426/420
[58] Field of Search ................. 426/420, 96, 594, 595, 426/596, 308, 289, 132, 302, 78

[56] References Cited

U.S. PATENT DOCUMENTS

| | | | |
|---|---|---|---|
| 1,204,881 | 11/1916 | Kern | 426/132 |
| 4,011,130 | 3/1977 | Worden | 162/175 |
| 4,076,847 | 2/1978 | Johnson et al. | 426/594 |

OTHER PUBLICATIONS

*Coffee,* Frederick Foot, Spice Mill Publishing, New York, N.Y., 1925, pp. 134–138.

*Primary Examiner*—S. Leon Bashore
*Assistant Examiner*—William F. Smith
*Attorney, Agent, or Firm*—Price, Heneveld, Huizenga & Cooper

[57] ABSTRACT

A granular product to be used for brewing a high yield, coffee tasting beverage, formed of coffee flavored extract from pulverized roast and ground coffee impregnated into and coated onto edible nut shell particles, utilizing only a fraction of roast and ground coffee of that normally necessary to produce comparable beverage yields. A process to make such product by mixing an aqueous pulverized roast and ground coffee into and onto nut shell particles and drying such, effecting a stable granular material with the appearance of conventional roast and ground coffee and with the capacity for brewing a coffee tasting beverage while at least doubling the cup yield per unit weight of roast and ground coffee used.

12 Claims, No Drawings

BEVERAGE PRODUCT AND PROCESS

RELATED APPLICATION

This is a continuation-in-part application of my co-pending application Ser. No. 803,147 filed June 3, 1977 and entitled BEVERAGE, abandoned.

BACKGROUND OF THE INVENTION

This invention relates to a coffee-type beverage and more particularly to a granular product closely resembling roast and ground coffee of American ground style for use in brewing a coffee tasting beverage, and to a method of forming such product.

The increased cost of coffee in recent times has become a financial burden for coffee drinkers and those institutional users such as stores, restaurants and office coffee service groups. There is a need for an economical coffee product at prices only a fraction of the present prices.

Prior art emphasizes use of coffee substitutes such as roasted garbanzo beans, barley, chicory or wheat, alone or as additions to coffee. The mixed components tend to separate in the can during transport. Accordingly, there is a lack of uniformity in the taste of the beverage brewed from commercially available coffee with substitutes. Also, these substitutes usually have only marginal appearance of real roast and ground coffee.

Some recent commercial efforts involve reduction of roast coffee particle size to increase extraction of solubles during brewing. This general practice has been known and practiced for many years in Europe and Asia where coffee drinkes do not object to a dark beverage containing suspended particles. In America, cultural factors and habits of coffee drinkers cause a definite preference for a clear beverage brewed from coarse roast granules. Further,, extraction from a fine roast coffee powder is actually not nearly effective as might be theoretically predicted because of poor fluid flow through the particles with resulting channeling type flow or the like, preventing optimum extraction.

SUMMARY OF THE INVENTION

The product of the present invention extends the flavor yield of the basic coffee ingredient. This is done by specially making more basic coffee flavor ingredients available upon brewing. The invention involves pulverizing of roast and ground coffee, yet providing the coarse granules of conventional American ground coffee and without the brewing problems normally encountered with pulverized coffee. The roast and ground coffee is reduced to powder form and is impregnated as an aqueous slurry into and onto a granular matrix of ground shells of edible nuts to effect a product providing the characteristics which are acceptable because compatible with cultural and habit factors. Moreover, even though using only ounces of the pulverized roast coffee bean ingredient in a pound of the treated granules, the product effectuates comparable cup yield to that of commercial roast and ground coffee. The beverage is a clear brown beverage as is expected by coffee drinkers, with a flavor comparable to that to which they are accustomed. The particles of unbrewed coffee appear like conventional roast, coarse ground coffee. In other words,, the product looks like the various U.S. marketed forms of roast and ground coffee, can be brewed in the fashion of such coffee, and effect a similar beverage flavor and appearance. Yet the novel product can be provided at a fraction of the cost of roast and ground coffee. It is capable of high solubles extraction, without the disadvantages usual from solubles extraction from pulverized coffee, i.e. poor water flow through the powder and a resulting weak beverage or one that is blackish in appearance and carries suspended particles rather than being clear.

DESCRIPTION OF THE PREFERRED EMBODIMENT

The granular matrix comprises particles of nut shells formed by crushing the shells of edible nuts, preferably black walnuts, which serve as a matrix into and onto which a concentrated coffee flavored liquor is absorbed and adsorbed. The nut particles are porous and have adsorptive and absorptive qualities to the coffee slurry. The coffee oils are believed to be retained by the shell particles to impart flavor and aroma characteristics to the beverage.

The granules or particles of nut shell can vary in size as desired, to correlate in size and appearance to the type of roasted coffee which it is chosen to simulate. The range is about −14 to about +30 mesh. As examples, the particles will preferably be in the mesh range of about 8 to 16 for standard percolator size preparation, in the mesh range of about 12 to 24 for drip size preparation, and in the mesh range of about 20 to 36 for European or Melittatype preparations. These are only exemplary. The granules are functional at various sizes, even larger and smaller than these noted. It will be realized that the smaller granules expose more particle surface area to the brewing water for faster brewing. The finer particles may be retained in a porous retainer. The larger particles are preferred. They closely resemble conventional U.S. ground coffee when treated in accordance with the invention and will be retained in the coffee retainer in normal fashion.

The shells of various types of edible nuts have been found to be suitable in this invention. It is important that the shell particles retain the aqueous coffee liquor or slurry, and continue to retain the flavor essence of the coffee liquor when dried. In this regard, I have found valuable the usual treatment given the shells by the nut meat producers. With black walnuts for example, the producers wire brush and sand blast the nut shells before crushing them to remove the meat. While their primary goal is to eliminate the possibility of contamination of the meat by eliminating the possibility of contact between the meat and certain contaminants on the shell surface, such treatment is desirable to the present invention for the additional reason of eliminating the hard surface of the shell and exposing the more porous shell interior.

Hardwood nut shells are employed, particularly walnut shells, preferably black walnut shells. These have porosity, are readily available, and do not impart an undesirable flavor component to the beverage. These shell particles are also pretreated in conventional fashion by hot water cleaning and/or steaming after crushing, to assure sanitation. The particles are light tan in color. The porosity of these particles is such that some of the coffee liquor and slurry impregnates to some degree into the outer surface, up to about 1/64 to 1/32 of an inch. Some remains adhered on the surface. After drying, the deposit from the liquor is retained by the particles and does not merely rub off. It is available for rapid leaching therefrom with hot water. One function of the nut shell particles therefore is to serve as a retaining matrix for the dried coffee flavor substances applied to the particles as an aqueous liquor. The shells of related edible nuts such as English walnuts and hickory nuts are not as porous and do not work as well as black walnut shells.

Basically, roast coffee bean ingredients and other optional additive ingredients explained hereinafter are first pulverized, i.e. converted to powder of a consistency comparable to that of wheat flour and then added to hot water, e.g. near boiling, to form a dark brown slurry believed to have material in solution and some in suspension. The coffee flavor ingredient may comprise only coffee. The coffee may, if desired, be diluted or modified with one or more of the following additional ingredients: roasted soybean, roasted chicory, dandelion root and roasted sunflower seed. Indeed, coffee can be eliminated altogether if roasted soybean and roasted chicory, preferably with dandelion root, are used together in the basic flavor ingredient. This combination is not preferred to the coffee used alone or the coffee plus additives. The powdered roasted sunflower seed is more of an optional ingredient in the basic flavor composition and is used when desired to give a nut-like flavor.

Whichever of the above ingredients is employed must be pulverized to powder form. The powder must be sufficiently fine to suspend and/or dissolve readily to form the slurry-type liquor to impregnate and cling to the matrix. I have had excellent results with the matrix materials discussed herein by pulverizing to a consistency and fineness comparable to commercially available flour. Measurements of the pulverized particles show a size range of about 0.01 mm to 0.1 mm, with the majority being in the range of about 0.01 to 0.05 mm in diameter. Various pulverizers can be used. One type I have used is a small mill with a high speed pulverizing blade which is especially made for converting seeds and the like into powder. A common kitchen blender could also be used. "Miracle Mill" ® Model 600 available from Miracle Exclusives of New York, N.Y., is an example of an operable mill. It takes only about 10-15 seconds to reduce any of the above ingredients to powder form. If the pulverizing is excessive, a fudge-like paste results. The pulverizing process must stop before this paste occurs. Alternative pulverizers include a hammer mill, a disc mill, or a cone mill.

I have used commercially available roast and ground coffee which I pulverized to a powder. Of course, in manufacture, the roasted beans could be pulverized directly to a powder.

The soybeans, sunflower seeds, dandelion root and chicory (in bean-like pellet form) are roasted to a coffee brown color prior to pulverizing. Conventional roasting temperatures (i.e. around 450° F.), times, and ovens or roasters can be employed. All of these ingredients are available on the market in roasted form, but are not usually roasted enough, i.e. to a coffee brown color, and are preferably further roasted as necessary.

The finely powdered flavor ingredients are slowly blended with hot water, e.g. near boiling, while stirring continuously, and the mixture is then stirred and heated until again near or at boiling. The ratio of the dry roasted beans, seeds, or root flavor ingredient to water is such that there is sufficient water for fluidity but not so much water that evaporation time and energy are needlessly extended. The exact ratio is not critical. It is important that there be enough water to create a homogeneous appearing liquor or slurry rather than a paste or separated mixture. About 10 fluid ounces of water to about 4-6 ounces of basic flavor ingredient has been found operable. The flavor ingredients can be added separately if there are more than one, or they can be preblended and then added. Heating, e.g. at or near boiling, is continued until the ingredients are fully dispersed forming the dark brown aqueous slurry-type liquor. This liquor has a homogeneous appearance as would a true solution, but is a suspension of insoluble components in a water solution of the soluble components.

At this point, the matrix particles of nut shell are blended with the liquor while vigorously stirring or blending to allow equal surface saturation and coating of each shell particle while continuing to heat. The combination is continued under heat and is vigorously stirred until the liquor is equally distributed, coated and absorbed, leaving a damp, dark brown particulate mass appearing like wet coffee grounds. This process takes relatively few minutes for smaller batches of the type referred to in the examples. The damp, particulate, moisture-containing granules are then dried in an oven, a commercial rotary or fluid dryer, or the equivalent, to a stable moisture content, i.e. until the particles no longer appear damp and become free flowing. The moisture content of the material will typically be less than about six percent by weight. The drying step takes about one-half hour at 160° F. with use of an oven, but will of course vary depending upon the equipment, the size of the batch, and the like. The dried product is cooled and placed in moisture and air tight containers such as glass jars, packages, bottles, or evacuated containers, e.g. cans, or the like. An aroma-type compound can be dusted on the final dried granules prior to vacuum sealing.

The ratio of flavor ingredients to the matrix component can be varied. The resulting coffee flavor can be made much stronger than real coffee so that a lesser amount will brew a cup of coffee substitute comparable to a cup of real coffee, or it can be made weaker so that more is required to brew a comparable cup. However, it is most desirable from the standpoint of the typical household consumer to create a substitute which acts just like real coffee. People do not readily change food and beverage preparation and eating habits, and the novel product is uniquely able to accommodate these habits. About 3 to 5 ounces of basic pulverized flavor ingredient to about 13 to 11 ounces of matrix makes a coffee extender or substitute comparable in strength to conventional ground roast coffee. Stated another way, the ratio of carrier matrix to pulverized roast and ground coffee is from about 2:1 to about 4:1.

In this context, it is significant that 4 ounces of pulverized roast coffee retained on 12 ounces of the ground black walnut shell matrix provides just as many cups of coffee, of at least comparable strength, as one pound of conventional coarse ground and roast coffee. Optionally, use of 2 ounces of the other extender ingredients noted enables 2 more ounces of coffee to be substituted. And by using 4 ounces of a mixture of chicory and soybean or chicory, soybean, and dandelion root, in a ratio range of from 1:4 to 4:1 (with sunflower seeds optional), pulverized coffee can be eliminated altogether. Although this is not preferred, the resulting one pound of substitute will make as many cups of a beverage which tastes fairly comparable to brewed coffee beverage as the coffee beverage from one pound of coarsely ground roast coffee.

Extensive and repeated experiments have shown that the minimum amount of added ingredients of roasted coffee, roasted soybean, roasted chicory and roasted sunflower seed should be about 20% to about 35% by weight of the final product. Interestingly, the ratio of roasted coffee to the other components has not been found to be critical except that, to prepare a coffee-like tasting beverage having an optimum simulation of coffee taste and aroma, the amount of pulverized coffee should be at least 50% of the powder ingredients used to form the liquor. The cost of the ingredients other than coffee is relatively small. Therefore, the total cost is only a fraction of that of an equivalent amount of coffee. The pulverized coffee ingredient can be made less than about 10% of the total without significantly altering the usefulness of the product.

The novel product can be handled, stored, packaged, and brewed like conventional roast and ground coffee. It looks like roast and ground coffee. The particles "flow" like particles of roast and ground coffee. The product can be brewed for preparation of coffee beverage in the fashion of "drip coffee", "percolated coffee", or for coffee brewing machines employing a coffee "packet" and filter.

It is noteworthy that the addition of a small amount of roast chicory darkens the color of the resulting beverage, a factor which is known and desirable to some persons, while lending the known chicory flavor. It is also believed to impart added sticking or retention character when pulverized with the coffee granules, for retention of the pulverized powder to the matrix granules. A small amount of added corn syrup can have a similar retention effect for the powder, without significantly altering the flavor of the beverage. Neither of these essential, however.

Further experimentation has established that the novel product exhibits better coffee aroma if only part of the pulverized roast coffee is formed into a slurry and blended with the shells under heat, with the remainder of the pulverized coffee being added to and blended by stirring with the granules of matrix after such blending and before the mass is dried. The subsequently added coffee powder therefore is not subjected to the hot water, enabling it to readily retain more of the ingredients that lend aroma. These powder particles cling to the treated matrix granules to supply uniformity to the product, and be available for dissolution during subsequent brewing. Because of the improved aroma occurring with this variation, it is preferred.

A few specific examples employing the concept are as follows:

EXAMPLE 1

3 ounces of roasted coffee were ground to powder. 1 5/6 ounce of roasted chicory was ground to powder. 1½ ounces of roasted soybeans were ground to a powder. 0.1 ounce of roasted sunflower seed was ground to a powder. These powder ingredients were blended together, the powder being basically of a consistency comparable to that of wheat flour conventionally sold on the marketplace.

Separately, about 10 ounces of water were heated. Then the powdered ingredients were added to the water while continuously stirring and heating the materials to again bring the combination to a near boiling state. The result was a dark brown liquor.

Next, 16 ounces of crushed black walnut shells of a particle size of 8 to 12 mesh which had been cleaned and steamed were poured into the liquor and the entirety stirred while continuing to heat. The ingredients were then vigorously stirred for about two minutes while continuing to heat, to effect uniform distribution of the slurry with the matrix granules. This gave uniform and thorough coating and surface penetration of the granules with the coffee oils and associated ingredients, leaving a wet, dark mass. The direct heat was stopped at this point to avoid scorching of the product. The damp product was then spread on a metal tray surface for maximum surface exposure, and was dried by placing it in an oven at a temperature of about 160° F. (i.e. below 212° F.). Preferably, the product was stirred during drying to expose fresh surface area.

The dried flowable particulate dark brown product appeared just like commercially available ground roasted coffee. When individual particles were dissected, it was noted that the liquor had penetrated and ingredient oils were absorbed to some extent into the particles, and also coated, i.e. adsorbed onto the particles.

A coffee tasting beverage was then prepared from this product by adding the particles to a coffee maker in the ratio of one teaspoon of product to each cup of water, and percolated. The coffee tasting beverage resulting looked and tasted like brewed coffee.

Blindfold comparison tests were made between a commercial instant coffee product beverage, and the beverage prepared from this product, with the result that the users were not able to tell which was which.

EXAMPLE 2

In this and subsequent examples, the procedure followed was as above, except that the powdered roasted components were not blended prior to being separately charged into the boiling water:

| Matrix (nut shell particles) | 16.0 oz. |
|---|---|
| Powdered Coffee | 3.2 oz. |
| Powdered Roasted Sunflower | 1.7 oz. |
| Powdered Roasted Chicory | 1.7 oz. |
| Malt | 0.4 oz. |
| Malt was added as an optional flavor ingredient. | |

The resulting coffee-like beverage brewed a good tasting cup of coffee beverage in accordance with conventional brewing techniques. All of the remaining examples similarly brewed good tasting coffee beverages.

EXAMPLE 3

| Matrix | 16.0 oz. |
|---|---|
| Powdered Coffee | 3.2 oz. |
| Powdered Roasted Sunflower | 1.4 oz. |
| Powdered Roasted Chicory | 2.0 oz. |

EXAMPLE 4

| Matrix | 16.0 oz. |
|---|---|
| Powdered Coffee | 3.2 oz. |
| Powdered Roasted Chicory | 2.0 oz. |
| Powdered Roasted Soybean | 1.3 oz. |
| Powdered Roasted Sunflower | 0.4 oz. |

EXAMPLE 5

| Matrix | 16.0 oz. |
|---|---|
| Powdered Coffee | 4.3 oz. |
| Powdered Roasted Sunflower | 0.1 oz. |
| Powdered Roasted Chicory | 3.4 oz. |

This particular mix of no. 5 was too strong to be brewed in proportions of regular coffee. It made good "coffee"-type beverage by cutting back on the quantity used per cup.

EXAMPLE 6

| Matrix | 16.0 oz. |
|---|---|
| Powdered Coffee | 3.2 oz. |
| Powdered Roasted Sunflower | 1.4 oz. |
| Powdered Roasted Chicory | 2.0 oz. |
| Malt | 0.4 oz. |

EXAMPLE 7

| Matrix | 16.0 oz. |
|---|---|
| Powdered Coffee | 3.2 oz. |
| Powdered Roasted Sunflower | 1.4 oz. |
| Powdered Roasted Chicory | 2.4 oz. |

EXAMPLE 8

| Matrix | 16.0 oz. |
|---|---|
| Powdered Roasted Chicory | 3.4 oz. |
| Powdered Roasted Soybean | 4.2 oz. |

This brewed a good beverage simulating coffee very closely in flavor but using no coffee bean ingredient at all.

EXAMPLE 9

| Matrix | 16.0 oz. |
|---|---|
| Powdered Coffee | 6.0 oz. |

This brewed an excellent cup of coffee, using conventional brewing proportions and equipment.

EXAMPLE 10

6 ounces of Arabica-type conventionally roast and ground coffee granules were pulverized to a powder of about 0.01 mm to 0.1 mm in diameter. 3 ounces of the coffee powder were added to water previously heated to about 200° F., with stirring and continued heating to produce a dark brown liquor or slurry in about two minutes. This slurry was thoroughly blended by stirring with black walnut shell granules having a size range of about 8 to 16 mesh for two minutes. To the resulting wet dark mass was added, by stirring, the remaining 3 ounces of coffee powder. The product was spread on a metal tray and dried at temperatures of about 180° F. to a stabile moisture content at which the particulate product was flowable. Beverage was then brewed from this product by conventional coffee brewing techniques.

EXAMPLE 11

2 ounces of roasted chicory, 2 ounces of roasted dandelion root, and 1 ounce of roasted soybean were pulverized to a powder and blended together. The powder was added to hot water at a temperature of 190° F. and stirred to form a slurry. This slurry was then blended, with vigorous stirring, with walnut shell granules for a few minutes until free liquor was not noticeable and a dark wet mass resulted. 2 ounces of pulverized roast coffee powder was then blended with the wet mass by vigorous stirring, causing the coffee powder to cling to the granules. The combination was then dried until the particles no longer appeared damp and became free flowing.

This product was then brewed in a Bunn-type coffee maker according to standard techniques for brewing conventional roast and coarse ground coffee. A very acceptable coffee tasting beverage was produced.

Comparative tests and analyses were made to determine the percent solubles yield in beverage brewed from the novel product made according to the invention as compared to that from pulverized roast and ground coffee (the control) and as compared to known data on conventional roast and ground coffee. Three tests believed representative of the invention involved the following data:

| Test No. | Weight of Components (grams) | | | % Solubles in Liquid Beverage | % Solubles Yield of Coffee | Strength & Flavor |
|---|---|---|---|---|---|---|
| | Nut Shell Matrix | Pulverized Roast & Ground Coffee | Water | | | |
| 1. | 220 | 220 | 120 | 0.92% | 36% | Acceptable |
| 2. | 200 | 200 | 80 | 0.91% | 35% | Acceptable |
| 3. | 150 | 150 | 80 | 0.80% | 33% | Acceptable |

The first two tests employed roast and ground coffee pulverized on a Braun propeller-type grinder. The third test employed a commercial Ohlsson grinder set at Turkish grind. All three tests employed Arabica-type coffee. (If Robustatype coffee had been used, the % solubles would be somewhat higher.) By comparison, the control of pulverized roast and ground coffee without the matrix gave only about 0.66 wt. % solubles yield (in contrast to 33–36%), too weak for use as a beverage. Theoretically, pulverized coffee should give a higher solubles yield than coarse ground because of greater surface exposed to the leaching water, but the typically poor yield actually results from just pulverized coffee. This is perhaps because of poor extraction due to water channeling or occlusion of the water flowing through the powder, such that ineffective extraction occurs. This data on the control stands in stark contrast to the distribution of pulverized roast and ground coffee among the walnut shell particles which seem to allow uniform and thorough extraction in brewing. (According to standard procedures, the % Solubles in Liquid Beverage is calculated by brewing the beverage, weighing it, filtering it, evaporating the water, weighing the residue and comparing the residue weight to the weight of the brewed beverage. The % Solubles yield of coffee data is obtained by comparing the residue weight to the weight of the dry coffee starting material).

These test result yields of about 33% to 36% are equivalent to 128 cups (150 ml) beverage per pound of granular product, which compares very favorably to the typical institutional coffee standard of about 64 cups of beverage per pound of coffee. Conventional roast and ground coffee typically yields about 16 to 19% solubles. Americans prefer this coarse ground coffee with the resulting clear beverage.

These tests and analyses were performed by Dr. Michael Sivetz. Independent testing at a separate testing laboratory, namely Prein & Newhoff in Grand Rapids, Michigan yielded comparable results.

It will be realized that the commercial practice of this invention might employ pressure-type impregnation at temperatures at, below, or above 212° F., vacuum-type evaporation of the free liquid at temperatures below 212° F., and other variations equivalent to what is specifically taught, without deviating from the spirit of the invention.

The embodiments of the invention in which an exclusive property or privilege is claimed are defined as follows:

1. A brewable coffee-type product comprising: matrix granules of shells of edible nuts having pulverized coffee retained at the surfaces thereof.

2. The product of claim 1 wherein said matrix granules are of walnut shells.

3. The product of claim 2 wherein said matrix granules are of black walnut shells.

4. The product of claim 1 wherein the ratio of matrix granules to pulverized coffee is about 1:4 to about 4:1 by weight.

5. The product of claim 1 including at least one of the group consisting of roasted pulverized soybeans, chicory, sunflower seeds, and dandelion root retained at the surfaces of said matrix granules.

6. A brewable coffee resembling product comprising: matrix granules of shells of edible nuts having pulverized roasted chicory and soybean retained at the surfaces thereof.

7. The product of claim 6 also including at least one of the group consisting of pulverized roasted dandelion root, sunflower seeds, and coffee at the surfaces of said matrix granules.

8. A method of producing a brewable coffee-type product comprising the steps of: pulverizing roasted coffee to powder form; forming an aqueous slurry liquor of the coffee powder; blending said slurry liquor with matrix granules of shells of edible nuts to form a damp mass; and evaporating the moisture from said damp mass to dry said damp mass to a flowable granular product.

9. The method of claim 8 wherein said blending step includes blending of at least one of the group consisting of roasted pulverized soybeans, chicory, sunflower seeds, and dandelion root.

10. The method of claim 8 wherein said shells are black walnut shells.

11. The method of claim 8 wherein part of said coffee powder is used to form said liquor, and part is added in powder form to said damp mass before said damp mass is dried to a flowable product.

12. A method of producing a brewable coffee resembling product comprising the steps of: pulverizing to powder form at least one of the group consisting of roasted soybean, chicory, dandelion root, and sunflower seeds; forming an aqueous slurry liquor with the powder; blending said slurry liquor with a matrix of shell granules of edible nuts to form a damp mass; blending pulverized roasted coffee with said damp mass; and drying said damp mass.

* * * * *

UNITED STATES PATENT AND TRADEMARK OFFICE
CERTIFICATE OF CORRECTION

PATENT NO. : 4,188,409
DATED : February 12, 1980
INVENTOR(S) : Charles Kay

It is certified that error appears in the above–identified patent and that said Letters Patent are hereby corrected as shown below:

Column 1, line 12:
  Insert ---coarse--- after "American"

Column 1, line 33:
  "drinkes" should be ---drinkers---

Column 1, line 37:
  Delete the second comma after "Further"

Column 1, line 65:
  Delete the second comma after "words"

Column 2, line 29:
  "Melittatype" should be ---Melitta-type---

Column 5, line 37:
  Insert ---are--- after "these"

Signed and Sealed this

First Day of July 1980

[SEAL]

Attest:

SIDNEY A. DIAMOND

Attesting Officer

Commissioner of Patents and Trademarks